United States Patent
Beesley et al.

(10) Patent No.: US 6,708,112 B1
(45) Date of Patent: *Mar. 16, 2004

(54) SYSTEM AND METHOD FOR CALCULATING A NAVIGATION ROUTE BASED ON ADJACENT CARTOGRAPHIC MAP DATABASES

(75) Inventors: Darin J. Beesley, Overland Park, KS (US); Michael Childs, Olathe, KS (US)

(73) Assignee: Garmin Ltd (KY)

( * ) Notice: Subject to any disclaimer, the term of this patent is extended or adjusted under 35 U.S.C. 154(b) by 0 days.

This patent is subject to a terminal disclaimer.

(21) Appl. No.: 10/423,748

(22) Filed: Apr. 25, 2003

Related U.S. Application Data

(63) Continuation of application No. 10/015,148, filed on Dec. 11, 2001, now Pat. No. 6,574,553.

(51) Int. Cl.[7] .............................................. G01C 21/30
(52) U.S. Cl. ................... 701/209; 701/23; 701/201; 701/208; 701/209; 701/212; 340/990
(58) Field of Search ...................... 701/200, 201, 701/208, 209, 210, 212, 23; 340/988, 990, 995.1

(56) References Cited

U.S. PATENT DOCUMENTS

| | | | |
|---|---|---|---|
| 5,546,107 A | 8/1996 | Deretsky et al. | 396/600 |
| 6,038,559 A | 3/2000 | Ashby et al. | 707/4 |
| 6,112,200 A | 8/2000 | Livshutz et al. | 707/4 |
| 6,122,593 A | 9/2000 | Friederich et al. | 701/202 |
| 6,169,956 B1 | 1/2001 | Morimoto et al. | 701/209 |
| 6,192,314 B1 | 2/2001 | Khavakh et al. | 702/209 |
| 6,298,303 B1 | 10/2001 | Khavakh et al. | 702/209 |
| 6,574,553 B1 * | 6/2003 | Beesley et al. | 701/209 |

* cited by examiner

*Primary Examiner*—Gertrude A. Jeanglaude
(74) *Attorney, Agent, or Firm*—Devon A. Rolf

(57) ABSTRACT

A method and apparatus are provided for calculating potential paths through a roadway network defined at least partially by separate, but adjacent data maps. First and second data maps are provided that are indicative of roadway networks for different geographic regions bounded by region edges, at least one of which is common to both geographic regions. The data maps are adjacent, and one data map contains the first location while the other data map contains a roadway segment over which the potential paths may travel. Potential paths are planned from the first location through the first data map. When a current potential path intersects an edge of the first data map, the intersection is identified by coordinate data. A transition point is located in an adjacent data map based on the location where the current potential path intersects the edge of the firs data map. The calculation method and apparatus continue from the transition point through the second data map toward the second location.

24 Claims, 6 Drawing Sheets

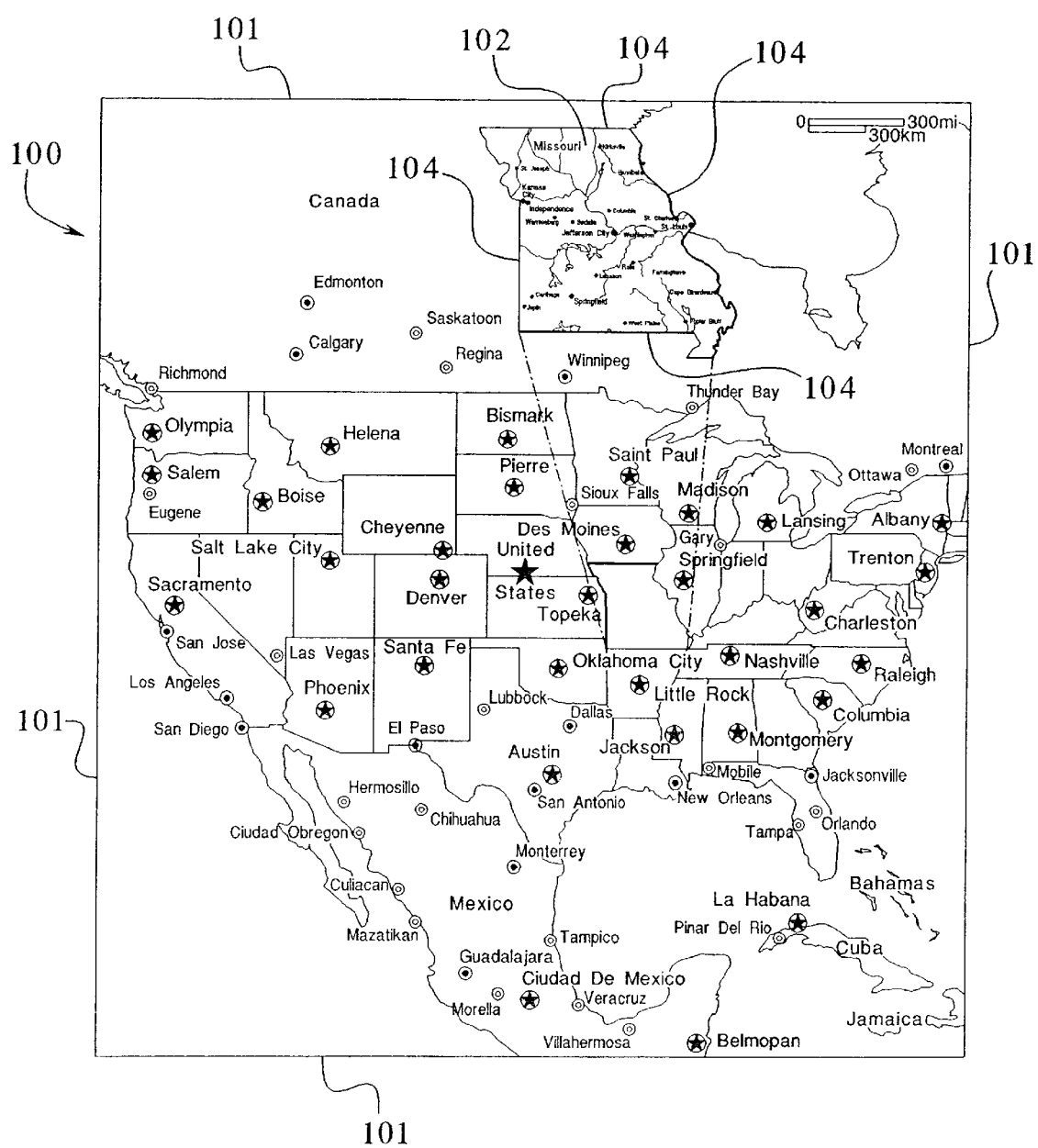

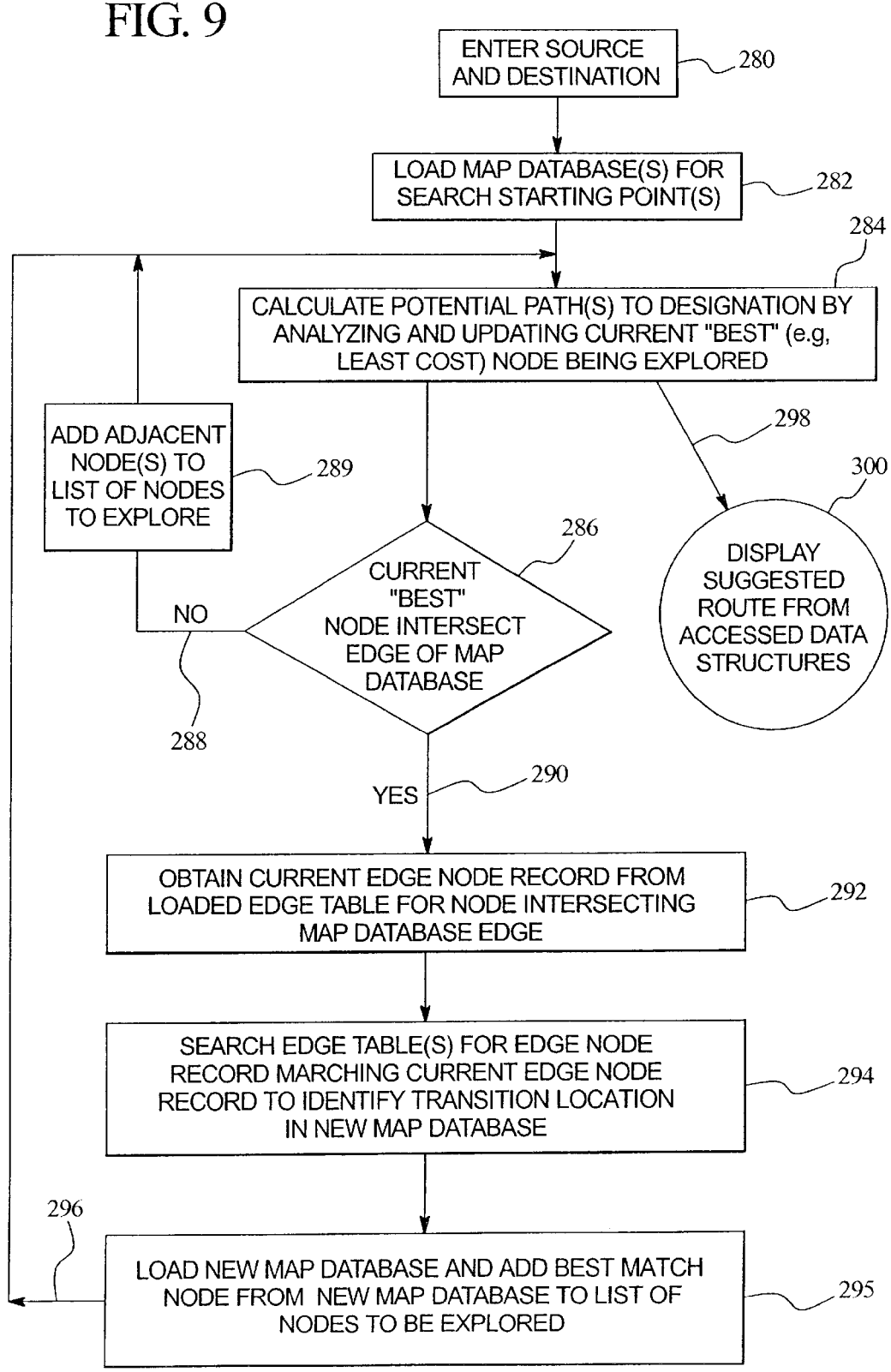

SYSTEM AND METHOD FOR CALCULATING A NAVIGATION ROUTE BASED ON ADJACENT CARTOGRAPHIC MAP DATABASES

RELATED APPLICATION

The present application is a continuation and claims priority benefit, with regard to all common subject matter, of an earlier-filed U.S. patent application entitled "System and Method for Calculating a Navigation Route Based on Adjacent Cartographic Map Databases", Ser. No. 10/015,148, filed Dec. 11, 2001, now U.S. Pat. No. 6,574,553, issued Jun. 3, 2003, and is incorporated hereby reference.

BACKGROUND OF THE INVENTION

Certain embodiments of the present invention generally relate to systems and methods for calculating navigation routes based on map databases indicative of adjacent geographic regions.

Route planning systems are well known in the field of navigational instruments. Route planning systems in general define one or more paths through a network of roads between source and destination locations. The path(s) planned by the system may be based on one or more criteria, such as shortest distance, shortest time, user preferences and the like. Several algorithms are known for performing route planning, with such algorithms calculating the route from the source or destination location or from both simultaneously. Conventional planning algorithms operate based on a predefined stored map database, which includes data indicative of a geographic region containing the source and destination locations.

In general, each map database corresponds to a particular geographic region, such as a city, a county, a state, a country, a continent, etc. Each map database contains data indicative of features within the associated geographic region with varied levels of specificity concerning the features. In general, map databases representing smaller geographic regions (e.g. cities) contain more detailed feature information (county roads, city streets, restaurants, and the like), while map databases representing larger geographic regions (e.g. states and countries) contain less detailed feature information (e.g. interstates, state highways, gas stations, hotels, rest stops, and the like). The feature information stored within each map database may include geographic coordinates (i.e. altitude, longitude and latitude) among other things. Each map database is bound by a geographic region perimeter or boundary that is intersected by roads of the roadway network that extend beyond the boundary.

Conventionally, a navigable network is comprised of roads, ferry routes, and possibly other means to travel from one location in the network to another. Conventionally the navigable network is described as a collection of intersections (know as nodes) of navigable features and links, arcs or paths (road, ferry, etc.) connecting nodes. Thus, the navigable network is viewed as a collection of nodes, at each of which a travel direction decision may be made, and a collection of links or arcs connecting the nodes and describing a travel path from one node to another. The term adjacency is conventionally used to describe the travel path and nodes reachable in the network from a given node. A solution between two points in the network involves iteratively examining the adjacencies from the start and destination points in the network, eventually "discovering" a low-cost path. Several well-known algorithms are designed to solve this problem, such as the A-star algorithm, various shortest path algorithms and the like.

Presently, cartographic information is charted or mapped by data suppliers as large cartographic data blocks. A single cartographic data block may include detailed maps for multiple adjoining metropolitan areas and/or detailed maps for large geographic areas and the like. A cartographic data block is typically divided by the data suppliers, by manufactures of the routing devices or by service providers into smaller map databases having a size more conducive to storage on, or wireless transmission to, a navigation or route planning device. By way of example only, a large block of cartographic data may constitute a detailed map of the metropolitan corridor for the East coast between Washington, D.C. and Boston. The cartographic data block may be divided into a first map database for the Washington, D.C. metropolitan area, a second map database for the Baltimore metropolitan area, a third map database for the Philadelphia metropolitan area, and so on. Unfortunately, a route cannot currently be charted using two separate map databases. For example, a route cannot be charted from an address located in Washington D.C. to a destination located in Baltimore using the aforementioned map databases.

Hence, conventional navigation and route planning devices are unable to plan routes between source and destination locations that are located in separate map databases, even if the separate map databases are adjacent to one another. Because conventional navigation and route planning devices are only able to calculate paths between sources and destinations in a single map database, the user is required to separately enter source and destination locations within each discrete map database. Stated another way, conventional systems provide map databases to describe the roadway network within a specific selected geographic area, but do not provide a means for the node exploration step to continue into adjacent geographic areas.

A need exists for improved navigation and route planning devices capable of automatically calculating routes between a single source location and a single destination location based on adjacent map databases. A need exists for a navigation device capable of accessing adjacent map databases to plan a route.

BRIEF SUMMARY OF THE INVENTION

It is a goal of certain embodiments of the present invention to enable node exploration to continue into adjacent geographic areas, effectively enabling a route to be computed through an arbitrary number of separately constructed, but adjacent, networks.

Certain embodiments of the present invention relate to a method for providing a navigation route between two locations. The method includes providing first and second data maps of different geographic regions. A group of potential paths are planned from the first location through the first geographic region based on the first data map. When each potential path intersects an edge of the first data map, a transition point in the second data map is identified based on the location where a current potential path intersects the edge of the first data map. The current potential path is further planned from the transition point into and/or through the second geographic region, based on the second data map, towards the second location. Optionally, the data maps may constitute first and second map databases which include data indicative of a roadway network or of nodes at which the roads intersect edges of the data maps. The method locates node coordinates where the roadway network intersects an edge of the first data map. The node coordinates may be used to identify the transition point. The data indicative of the node coordinates, at which roads intersect the edges of the first and second data maps, may be compared to identify the transition point in the second data map. The node coordinates are stored in an edge table associated with the second data map. Edge tables are searched for node coordinates which match the location where the current potential path intersects the edge of the first data map.

Optionally, multiple data maps may be analyzed corresponding to the geographic regions adjacent to the first geographic region, and one of the data maps may be selected as the second data map. The two adjacent data maps may be identified by organizing multiple data maps into a bounded box layout. To continue planning the current potential path through the second data map, node expansions are performed by looking at the nodes in the second data map that are linked to the transition point.

In accordance with another embodiment, a map database is recorded on a computer readable medium. The map database includes nodal records stored in a linked structure. The nodal records contain data indicative of nodes in a roadway network located in a geographic region within defined boundaries. Data indicative of the roads that intersect and join other nodes is also stored. Optionally, the nodal records may identify the nodes, the distance to the adjacent nodes, and the speed data for the roads connecting the nodes. The nodal records also include edge markers which indicate which nodes intersect the boundaries of the geographic region. The nodal records are stored in a manner to facilitate a match between adjacent map databases. The map database may further include an edge table that contains longitude and latitude coordinates indicating where the roads intersect the boundaries, or other data which identifies each road.

Edge/route coordinates which identify where roads intersect a boundary may be stored in a searchable format. The edge/route coordinates for one of the boundaries matches the edge/route coordinates stored in the map database for an adjacent boundary of an adjoining geographic region.

In accordance with another embodiment, a portable electronic device is provided. The device includes a memory, a processor and an output unit. The memory stores data maps of roadway networks for geographic regions that are surrounded by edges. The memory may store data indicative of roads in the roadway networks and nodes where the roads intersect the edges. The processor explores for potential paths through a first data map until the exploration intersects an edge of the data map. Then the processor automatically shifts the potential path exploration to a second data map. Upon successful route calculation, the output unit presents the route through the first and second data maps to a user. The device may further include a display to present the maps to the user.

The processor may identify a transition point to the second data map based on a location at which the current potential path intersects the edge of the first data map. Alternatively, the processor may locate the node coordinates of a location where the current potential path intersects an edge of the first data map and use the node coordinates to identify a transition point to the second data map. The data indicative of node coordinates may be compared where roads intersect the edges of the first and second data maps. Alternatively, the processor may search an edge table associated with the second data map for the node coordinates that match the location where the current potential path intersects the edge of the first data map.

The processor may organize the multiple data maps into a bounded box layout that identifies adjacent data maps. The processor may perform a node expansion by looking at the nodes in the second data map that are linked to the transition point to continue planning the current potential path through the second data map. The processor may identify an edge node in the first data map where the current potential path intersects the edge of the first data map and analyze the adjacent nodes in the second data map to shift the calculation of the current potential path to the second data map. The adjacent nodes constitute nodes in the second data map that directly connect roads to the edge nodes of the first data map.

In accordance with another embodiment, a navigation system is provided for calculating a route between two locations. The navigation system includes an input unit that accepts the first and second locations from a user. A memory is included that stores at least the first and second map databases that contain data indicative of two adjacent geographic regions. A route planner is also included. The route planner calculates potential paths from the first location through the first geographic region based on the first map database. When a current potential path intersects an edge of the first geographic region, the route planner accesses the second map database to continue calculating the current potential path toward the second location through the second geographic region that is based on the second data map. The first and second geographic regions may partially overlap one another. The memory may store edge tables that contain coordinates identifying nodes on the edges of the first geographic region that overlap the second geographic region.

BRIEF DESCRIPTION OF SEVERAL VIEWS OF THE DRAWINGS

FIG. 5 illustrates a cartographic data block utilized in connection with certain embodiments of the present invention.

FIG. 9 illustrates a flow chart of a procedure for calculating a route using edge maps in connection with certain embodiments of the present invention.

The foregoing summary, as well as the following detailed description of the preferred embodiments of the present invention, will be better understood when read in conjunction with the appended drawings. It should be understood, however, that the present invention is not limited to the precise arrangements and instrumentality shown in the attached drawings.

DETAILED DESCRIPTION OF THE INVENTION

Figure 1:
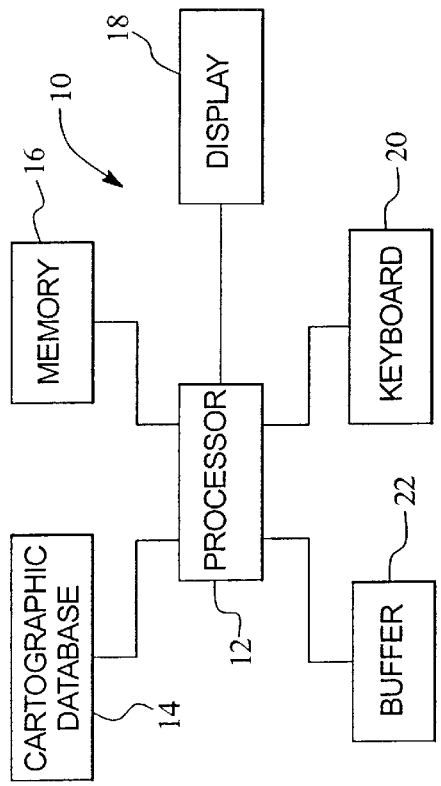
FIG. 1 illustrates a block diagram of a navigation device formed in accordance with an embodiment of the present invention.

FIG. 1 illustrates a system 10 formed in accordance with an embodiment of the present invention. The system 10 includes at least one processor 12 for carrying out various processing operations discussed below in more detail. The processor 12 is connected to a cartographic database 14, memory 16, a display 18, a keyboard 20, and a buffer 22. Optionally, more than one processor 12 may be included. The cartographic database 14 may store data indicative of a roadway network (in full or in part) used in connection with embodiments of the present invention. The memory 16, while illustrated as a single block, may comprise multiple discrete memory locations and/or discs for storing various types of routines and data utilized and/or generated by embodiments of the present invention. The buffer 22 represents a memory storage area that may be within memory 16 or separate therefrom. Buffer 22 is used to temporarily store data and/or routines used in connection with embodiments of the present invention. The display 18 displays information to the user in an audio and/or video format. The keyboard 20 permits the user to input information, instructions and the like to the processor 12 during operation.

By way of example only, initial operations may be carried out by an operator of the system 10, utilizing the keyboard 20 for controlling the processor 12 in the selection of parameters, defining map databases to be developed and/or accessed, and the like.

The map database(s) stored in the cartographic database 14, memory 16, and/or buffer 22 may include data indicative of features associated with a roadway network and/or a geographic area. The data may represent points, lines, areas, coordinates (longitude, latitude and altitude), or otherwise. For instance, portions of a highway, river or boundary (e.g., a state or country boundary), trails and the like may be represented by linear features stored in the map database. In addition, cities, towns, neighborhoods, communities and the like may be represented by point features within the map database. Also, buildings, lakes, parks and the like may be represented by area features. Prior to storage, various common features may be identified for cartographic data and such common features may be classified based upon predefined hierarchies. For example, interstate highways may be defined and/or organized as one feature class, state highways and roads may be defined as a second feature class, and county roads may be defined as a third feature class. Features other than roads, such as rivers and waterways, may also be classified. As a further example, geographic boundaries (e.g., state and county lines) may be assigned one or more different feature classes.

Figure 2:
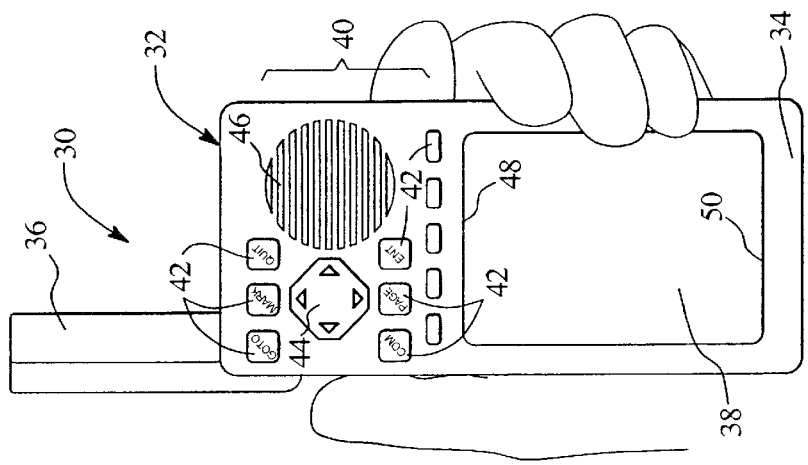
FIG. 2 illustrates a front view of a navigation device formed in accordance with an embodiment of the present invention.

FIG. 2 illustrates a portable electronic device 30 formed in accordance with an embodiment of the present invention. The electronic device 30 is oriented along a vertical axis (as illustrated) or horizontal axis when held by a user. The portable electronic device 30 includes a housing 32 having a face plate 34 and sidewalls and a back wall (not shown). The portable electronic device 30 further includes an antenna 36 mounted at one corner of the housing 32. The face plate 34 is substantially rectangular in shape. The face plate 34 securely frames the display screen 38 and houses the control panel 40. The control panel 40 includes several push button-type keys 42 that afford the user control over the portable electronic device 30.

Optionally, a directional toggle pad 44 may be included within the control panel 40. In one application, such as when utilizing the portable electronic device 30 within a global positioning system, the toggle pad 44 affords the ability to scan through a large map of a geographic area, all or a portion of which is stored in memory of the portable electronic device 30. The portable electronic device 30 then displays portions of the scanned map on the display screen 38. The display screen 38 also illustrates planned routes through geographic areas between source and destination locations. Optionally, the control panel 40 may include a speaker/microphone combination, designated by reference numeral 46, to afford communication between the operator and a remote destination.

The display screen 38 may be located below the control panel 40 (when oriented along a vertical axis) to afford easy data entry by the user. When vertically oriented, the display screen 38 is controlled to orient data upon the display screen 38 such that side 48 of the display screen 38 represents the top of the data to be displayed, while side 50 of the display screen 38 represents the bottom. Thus, the data is preferably displayed from the top 48 to the bottom 50 of the display screen 38.

Figure 3:
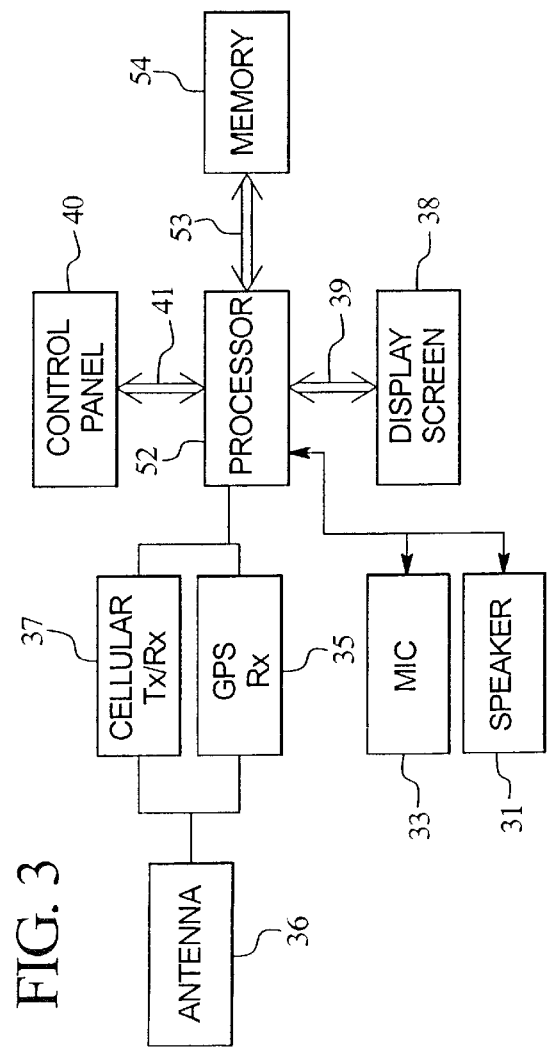
FIG. 3 illustrates a block diagram of a navigation device formed in accordance with an embodiment of the present invention.

FIG. 3 illustrates a block diagram for an electronic circuit of the portable electronic device 30 formed in accordance with an embodiment of the present invention. The electronic circuit includes a processor 52 that communicates via the control panel 40 through line 41. The processor 52 communicates via line 39 with the display screen 38. The electronic circuit further includes a memory 54 that is accessed by the processor 52 via line 53. The antenna 36 is connected to the processor 52 via a cellular transmitter/receiver 37 and a GPS receiver 35. The electronic circuitry of the portable electronic device 30 is powered by a power supply (not shown) housed within the device or connected thereto. A microphone 33 and a speaker 31 are also connected to, and communicate with, the processor 52.

The housing 32 of the portable electronic device 30 houses the processor 52, memory 54, display 38 and key pad 40. The display screen 38 and control panel 40 are accessible at the exterior of the housing. In one embodiment, the portable electronic device 30 is utilized in conjunction with a global positioning system for acquiring signals transmitted from satellites in geosynchronous orbit. In such an embodiment, the processor 52 includes means for calculating, by triangulation, the position of the portable electronic device 30. In such an embodiment, an image file indicative of a selected map is held in memory 54. In accordance with one embodiment, the image file held in memory 54 comprises spatial data indices according to a map database defining a geographic area of interest.

An operator of the portable electronic device 30 controls the processor 52 through use of control panel 40 to display map images on the display screen 38. Utilizing the control panel 40, the operator selects various zoom levels, corresponding to layers of the map database for a particular geographic region desired to be displayed on the display screen 38. Data indicative of the map to be displayed is accessed from the memory 54 according to the inputs by the user using the control panel 40. When performing a route planning operation, the operator enters a source location and a destination location, such as by entering addresses, geographic coordinates, well-known buildings or sites, and the like. The processor 52 accesses map databases stored in memory 54 to calculate a suggested route.

Figure 4:
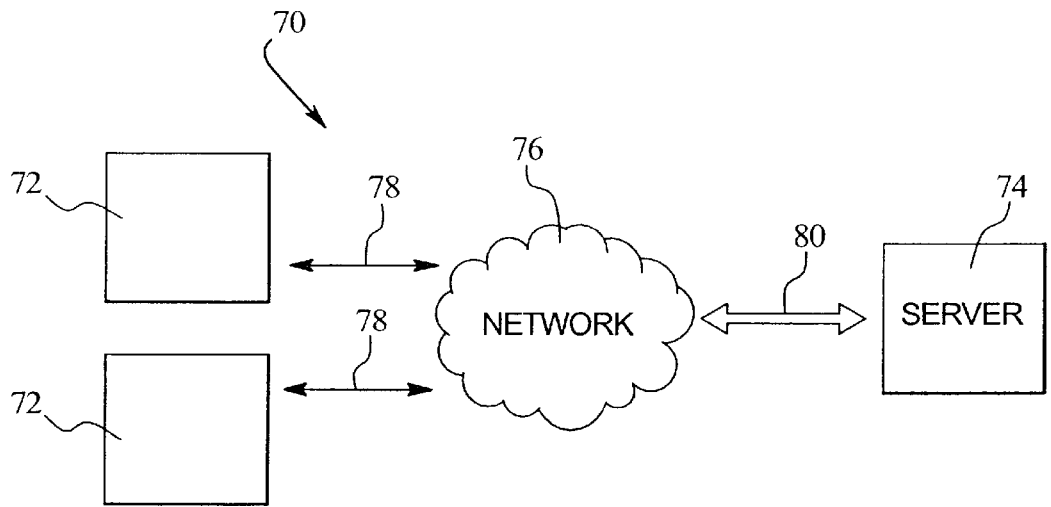
FIG. 4 illustrates a navigation system formed in accordance with an embodiment of the present invention.

FIG. 4 illustrates a navigation and routing system 70 formed in accordance with an alternative embodiment of the present invention. The system 70 includes one or more mobile units 72 capable of performing navigation and/or routing functions, a server 74 and an intervening network 76. The mobile units 72 may each include some or all of the structure and/or functionality of the portable electronic device 30. The server 74 may perform a majority of the navigation and route planning operations and transmit results and limited geographic data to the mobile units 72. Alternatively, the server 74 may simply perform minor management operations. The server 74 communicates with the mobile units 72 through communications links 78 and 80 and the network 76 which may constitute the internet, a wireless communications network supported by ground-based towers and/or satellites, and the like. The mobile units 72 may receive map databases, coordinate information, and the like over communications links 78 and 80 from the network 76.

Optionally, the server 76 may simply transmit map databases for requested geographic regions to the mobile units 72, after which the mobile units 72 carry out all necessary processing to perform navigation and routing operations. Alternatively, the mobile units 72 need not store the map databases. Instead, the server 74 may maintain the map databases and carry out navigation and routing calculations based upon requests received from the mobile unit 72. For example, the user may enter source and destination locations for a desired routing operation. The source and destination coordinates are transmitted from the mobile unit 72 through the communications links 78 and 80 and network 76 to the server 74 which calculates the desired route and returns such information to the mobile unit 72. In this alternative embodiment, the mobile unit 72 need not store large cartographic data blocks or map databases that would otherwise be needed to calculate and plan a route.

FIG. 5 illustrates a cartographic data block 100 including data indicative of a large geographic region bounded by edges 101. The exemplary cartographic data block 100 includes data representative of the continental United States and may be stored on the server 74, on disk or elsewhere. The cartographic data block 100 may include detailed feature data indicating the interstates, state highways, country roads, etc. in the United States, heretofore referred to as a roadway network.

The cartographic data block 100 is divisible into map databases 102, each of which includes data indicative of a selected smaller geographic region surrounded by a region edge 104. For example, the cartographic data block 100 may be divided into separate map databases 102 for each individual state. In the example of FIG. 5, each map database 102 includes data indicative of the geographic region associated with a corresponding state bounded by the state border. One or more map databases 102 are stored in memory 16 or 54, on the server 74, on disc or elsewhere. Optionally, the map databases may be transmitted upon request, or periodically to, mobile units 72 over communications links 78 and 80, and network 76.

Figure 6:
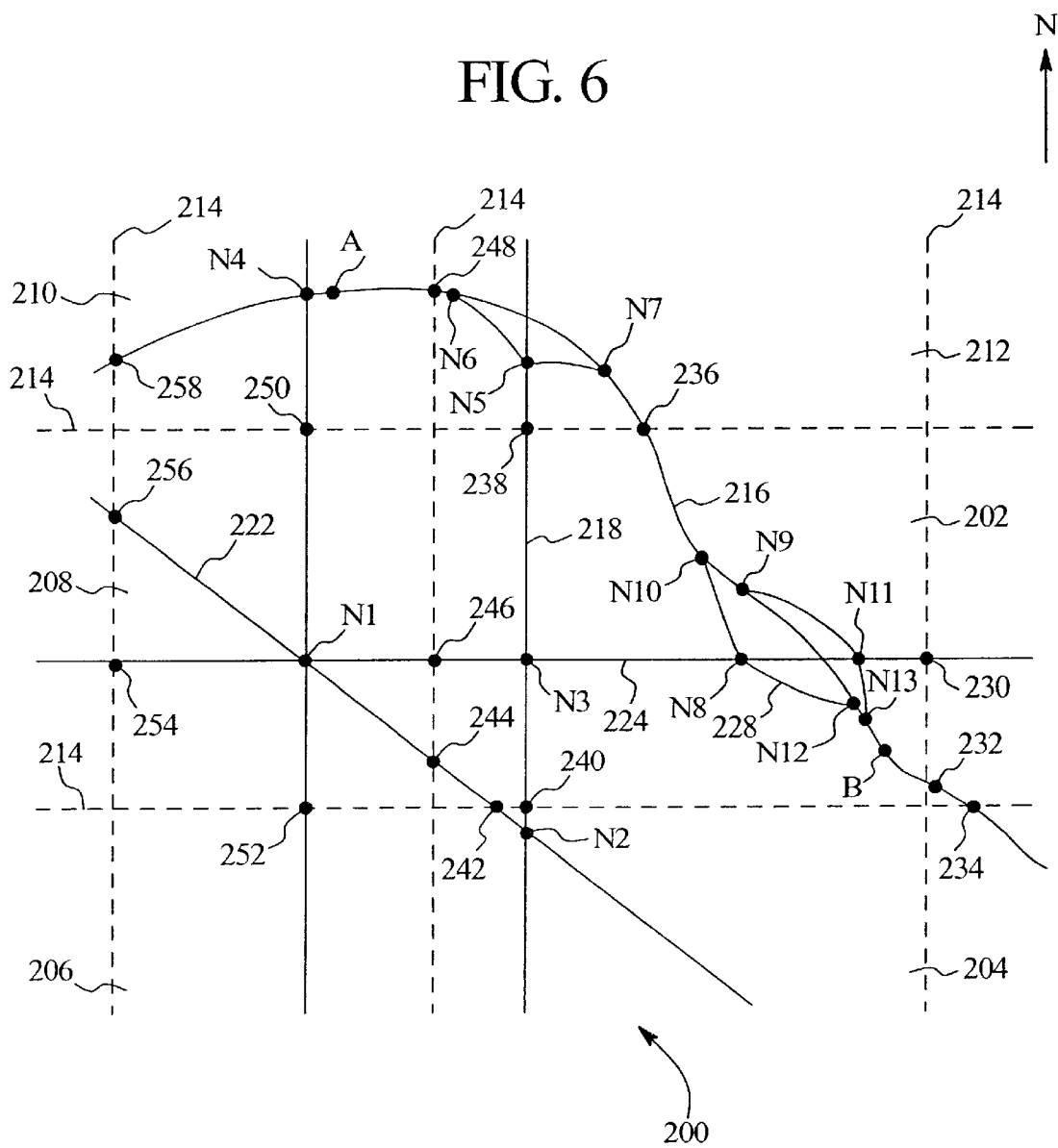
FIG. 6 illustrates an exemplary roadway network utilized in connection with certain embodiments of the present invention.

FIG. 6 illustrates an exemplary roadway network 200 utilized in accordance with certain embodiments of the present invention. Roadway network 200 may be a subset of the cartographic data block 100 that is divided into different map databases 102 represented by geographic regions 202–212. Each geographic region 202–212 is bounded by region edges 214 and is stored as a separate map database 102. The geographic regions 202–212 adjoin each other as they include common region edges 214. Roadway network 200 includes multiple roads 216–228. The roads 216–228 may be interstate highways, country roads, residential streets, or exit/entry ramps, for example. The roads 216–228 intersect one another at intersection nodes N1–N13. The roads 216–228 are formed of segments extending between intersection nodes N1–N13. At least some of the segments of the roads 216–228 cross the region edges 214. Points at which roads 216–228 intersect the region edges 214 are defined as edge nodes 230–258.

While FIG. 6 illustrates segments of roads 216–228 as intersecting the region edges 214, it is understood that nodes N1–N13 may also be located at region edges 214. Hence, edge nodes as used throughout shall refer to both intersections of segments with region edges 214 and to intersections of nodes (e.g., road intersections) that lie at region edges 214. In the example of FIG. 6, the map databases for geographic regions 202–212 are uniformly shaped. However, the geographic regions 202–212 need not have uniform edges, but instead, may have different shapes (e.g., circular, triangular, rectangular, trapezoidal and the like).

FIG. 6 also illustrates points A and B that lie along road 216. The segments of road 216 extending between points A and B will be discussed below in more detail in connection with certain embodiments of the present invention for creating and utilizing edge tables to establish and track a one-to-one correlation between edge nodes intersecting common region edges 214 between adjacent map databases.

Figure 7:
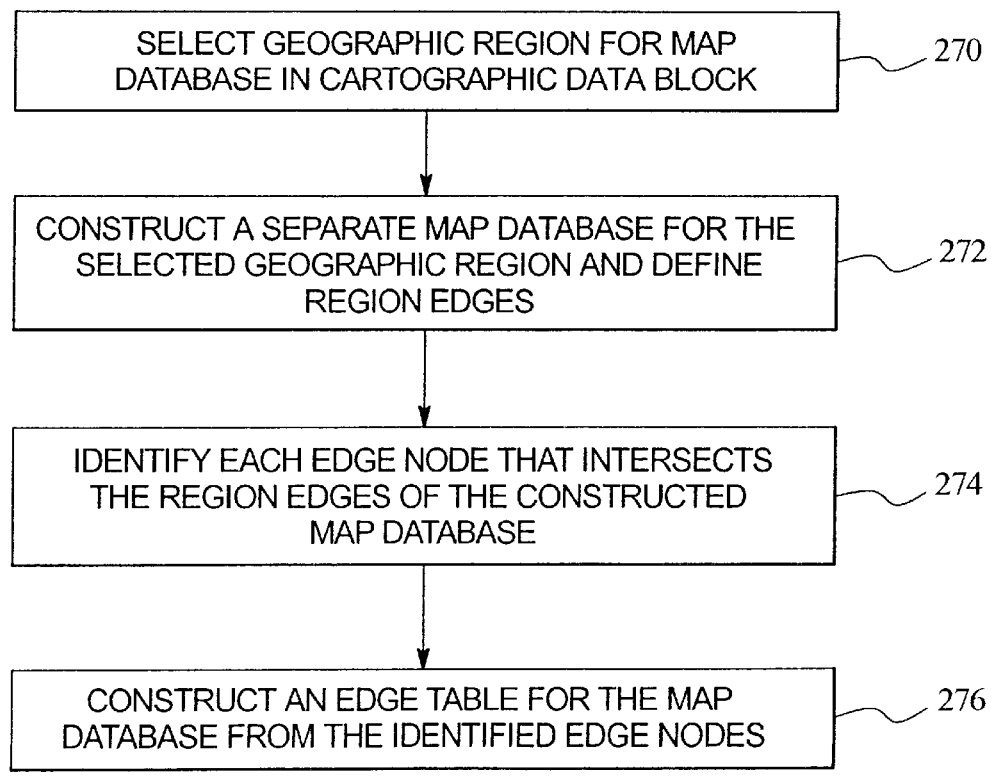
FIG. 7 illustrates a flow chart of a method for identifying transition points in accordance with certain embodiments of the present invention.

FIG. 7 illustrates a flow chart of a method for identifying and cataloguing edge nodes for feature data, such as nodes, segments and the like, intersecting region edges between adjacent map databases. The method of FIG. 7 may be carried out during or after the cartographic data block is cut or divided into map databases. Initially, a cartographic data block is accessed. At step 270, a geographic region that is a subset of the larger cartographic data block is selected. For example, the geographic region 202 of roadway network 200 in FIG. 6 may be selected.

Next, at step 272, a boundary is defined around an identified geographic region 202. The boundary is defined by region edges 214. The geographic region may be any size; however, the size of the geographic region may be limited by the amount of memory available in the route planning or navigation device. By way of example, a region edge 214 may follow a state line, a county line, a city limit border and the like.

At step 274, feature data (e.g., nodes, segments, and the like) is identified for each feature that intersects the boundary of the selected geographic area and corresponding map database constructed in step 272. At the point where the feature intersects the boundary, an edge node is created. Each edge node identifies a transition point at which the feature data, such as a road, transitions from one geographic region to another. Each edge node is identified to be at an edge by an edge marker. Each edge node may also store coordinate data such as altitude, latitude, and longitude for the point. Edge nodes are stored in nodal records in the same format as all other nodes. Additional feature data stored in nodal records may include feature class to identify the type of road (i.e. highway, residential, and the like) and speed data.

Referring to FIG. 6, when the roadway network 200 is divided into geographic regions 202–212, edge nodes 230–258 are identified as the points at which feature data, such as roads 216–228 intersect the region edges 214. For example, edge nodes 232–236, 248 and 258 are created for each point where road 216 crosses region edges 214. It should be noted that each of the edge nodes 230–258 identified in FIG. 6 identify the location where a feature intersects the boundary of at least two adjacent geographic regions 202–212. Therefore, each of the edge nodes 230–258 will be identified and operated upon twice, namely once for each map database having a common region edge 214. For example, edge node 240 will be analyzed twice, once for geographic region 202 and once for geographic region 204.

Continuing with the discussion of FIG. 7, at step 276, an edge table associated with the map database construed in step 272 is created based on the feature data identified in step 274. The edge table stores the feature data as edge node records, and is searchable in accordance with any of several known search methods. In the example of FIG. 6, the map database for each geographic region 202–212 is assigned a unique edge table containing the edge nodes 230–258 corresponding to the transition points of the associated region edges 214. Each edge table stores at least the longitude and latitude coordinate data for each edge node 230–258 that intersects the associated region edges 214. The edge table assigned to the map database associated with geographic region 202 stores coordinate data for edge nodes 230–232 and 236–246. The edge table assigned to the map database associated with geographic region 208 stores coordinate data for edge nodes 244–246 and 250–256. It should be noted that the coordinate data for edge nodes 244 and 246 is stored in the edge tables for both geographic regions 202 and 208. The edge tables created at step 276 in FIG. 7 for the geographic regions 202–212 in FIG. 6 may resemble edge table 112 (discussed below in connection with FIG. 8).

Figure 8:
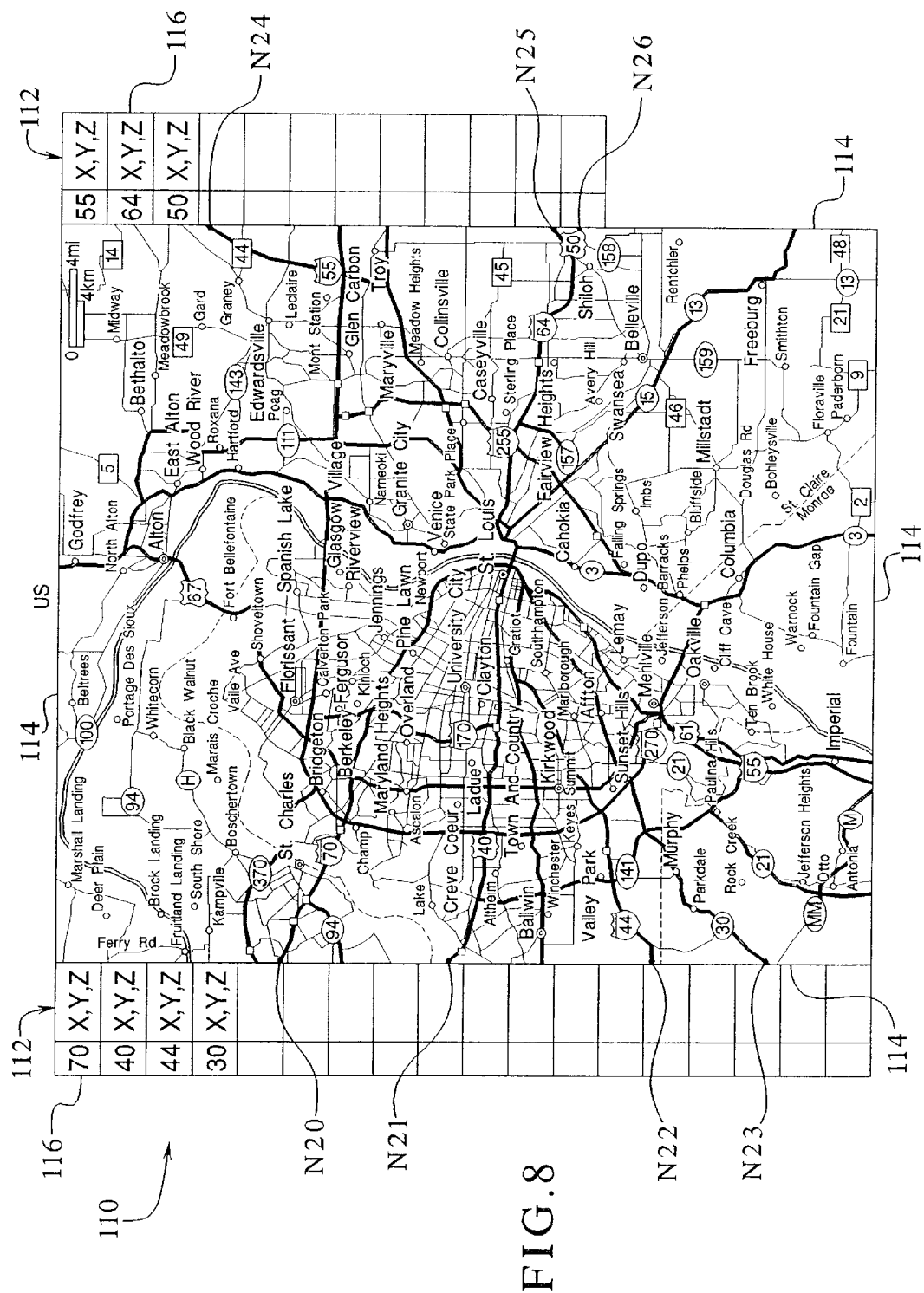
FIG. 8 illustrates an exemplary map database utilized in connection with certain embodiments o the present invention.

FIG. 8 illustrates an exemplary detailed map database 110 including data indicative of a geographic region for the St. Louis metropolitan area within region edges 114. The map database 110 has an edge table 112 assigned thereto storing edge node records 116 for edge nodes N20–N26 associated with the coordinates at which selected roads intersect region edges 114. In the example of FIG. 8, the edge table 112 stores coordinates for the edge nodes N20–N26 at which interstates 70, 64, 40, 44, and 55 and highway 50 intersect the region edges 114 of the map database 110. In the example of FIG. 8, "x, y, z" coordinates are stored representative of the longitude, latitude and altitude of the edge nodes N20–N26. The "x, y, z" coordinates are one example of a format for edge node records 116.

FIG. 9 illustrates a flow chart of a procedure for calculating potential paths through adjacent map databases using edge tables in accordance with at least one embodiment of the present invention. The procedure of FIG. 9 is described in connection with the exemplary roadway network 200 of FIG. 6. The navigation device initially obtains access to map databases defining a roadway network 200 for a plurality of adjacent geographic regions 202–212. Each map database corresponds to one of the geographic regions 202–212. The user enters source and destination locations at step 280. Referring to FIG. 6, the user may enter point A as a source location and point B as a destination location. At step 282, the navigation device loads or accesses a map database corresponding to the starting point(s) of a search. For instance, in a bidirectional search a map database would be loaded or accessed that surrounds point A and point B. In a unidirectional search, only one map database would be accessed or loaded, namely the map database surrounding the starting point of the search. Continuing the above example, the map database may identify geographic region 210.

The loaded or accessed map database(s) may be stored in the navigation device, memory 16, memory 54 or on the server 74. Accessing a map database may involve moving some or a portion of the map database to a section of memory in the navigation device or elsewhere readily accessible by the processor. Alternatively, mobile units 72 need not actually store the map database. Instead, the mobile units 72 may simply notify the server 74 that a particular map database is to be used or that a search should be performed beginning at a particular address. Thereafter, the server 74 may transmit some or all of the data from the map database to the mobile unit 72 as needed. Alternatively, the server 72 may perform the routing process upon the map database and simply provide status and result information to the mobile units 72.

At step 284, the navigation device (or server 74) begins calculating one or more potential paths from point A to point B. The routing algorithm may calculate potential paths simultaneously in opposite directions from both the source and destination locations (points A and B). Alternatively, the routing algorithm may calculate the path from one or the other of the source and destination locations. A variety of routing algorithms are known and may be used. Examples of routing algorithms are the A-star algorithm, various shortest path algorithms, and the like.

At step 284, the routing algorithm iteratively operates upon nodes in the loaded/accessed map database by analyzing and updating a current best node. The best node may represent the least costly node (on a list of nodes to be explored) that can be added to advance the search toward the destination. The node analysis and updating operation is generally referred to as node exploration. When a particular node is being explored, the routing algorithm performs a node expansion operation which involves finding all of the nodes that are adjacent (e.g., connected by road segments) to the node explored. By way of example only, the analysis may involve expanding node adjacencies for the current best node (e.g., adding the nodes that are adjacent to the current best node to the list of nodes to be explored). The analysis may also involve calculating a cost associated with each newly added node. When implementing an A-star algorithm, the cost is based on a known cost from the source and an estimated cost to the destination. Once the node adjacencies and associated costs are added to the node exploration list, a new current best node is calculated. For example, the new current best node may represent the node having the lowest cost associated therewith.

During each iteration through the node expansion operation, the routing algorithm loops between steps 284, 286 and 289 as it progresses through the nodes of the roadway network defined by the presently accessed map database. Once a new current best node is determined, the navigation device then determines (at step 286) whether a potential path or paths intersect a region edge 214 of the accessed map database(s) by accessing the edge marker for the node. When the potential path does not intersect the region edge, flow passes along path 288 to step 289. At step 289, the nodes adjacent to the current best node are added to the list of nodes to be explored. Thereafter, flow returns to step 284.

When the potential path or paths intersect the accessed map database boundary, flow passes along path 290 to step 292. At step 292, the navigation device obtains the current edge node record from the loaded edge table associated with the loaded map database. The edge node record obtained in step 292 corresponds to the edge node within the loaded map database intersecting the edge of the geographic region defined by the map database. In the example of FIG. 6, when searching potential paths extending from point A, the navigation device would obtain a current edge node record for edge node 248. The edge node record may represent longitude, latitude and altitude coordinates, such as illustrated in the exemplary edge table 112 in FIG. 8.

Once the current edge node record is obtained, flow passes to step 294 at which the navigation device searches other edge tables for an edge node record matching the current edge node record identified in step 292. The search carried out at step 294 ultimately identifies a transition location between the loaded map database and new map database(s) that adjoin the loaded map database along the region edge intersected by the current edge node. With reference to FIG. 6, once edge node 248 is identified at step 292, at step 294 the navigation device searches the edge tables associated with at least one other map database.

The navigation device may perform the searches at step 294 based upon all available edge tables, or alternatively, the navigation device may perform a more focused type of search based only upon a subset of the available edge tables. For instance, the navigation device may search only the edge table associated with the map database defining geographic region 212. Alternatively, the navigation device may only search edge tables associated with the map databases defining geographic regions surrounding the geographic region 210 (e.g., geographic regions 208, 202 and 212).

The search at step 294 of a single or a limited subset of edge tables may be facilitated by storing map linking data with the roadway network 200, such as joining map database links identifying a particular configuration of the map databases associated with the geographic regions 202-212. More specifically, the adjoining map database links may indicate that geographic region 212 adjoins the region edge 214 along the western side of geographic region 210. Alternatively, the joining map database links may simply indicate that geographic regions 208, 202 and 212 are located proximate geographic region 210.

From the edge tables, the navigation device determines whether a potential new map database includes one or more potential paths intersecting the region edge at the geographic coordinate, at which the planned potential path(s) intersect the region edge of the previously loaded map database. Continuing the example of FIG. 6, at step 294, an edge node record is found matching edge node 248 in the edge table for geographic regions 212. The edge node records for edge node 248 in the edge tables for geographic regions 210 and 212 may contain identical or at least equivalent feature information. The equivalent information may constitute matching longitude, latitude and altitude values in each edge table or values that are within an accepted range of one another.

Next, at step 295, the navigation device uses the transition location identified at step 294 in order to locate a new map database located adjacent to the previously loaded map database. The new map database is easily identified as it has a one-to-one correspondence with the edge table containing the edge node record matched at step 294 to the current edge node record obtained at step 292. Once the new map database is loaded at step 295, the navigation device also adds the edge node associated with the matching edge node record to the list of nodes to be explored at step 284. The matching node is referred to as the "best match node." With reference to FIG. 6, the new map database would correspond to geographic region 212 and the best match node would correspond either to edge node 248 or the next roadway intersection node N6. Next, control passes along line 296 to step 284 at which the navigation device continues calculating potential path(s) based on the new map database associated with geographic region 212.

The navigation device continues planning the potential path based on the newly accessed map database. This may be accomplished by node expansion, namely, by looking at the features of nodes linked to the transition location. Flow passes along path 298 from step 284 when the complete route is planned. At step 300, the suggested route between the source and destination locations is displayed from the map databases accessed in steps 282 and 295. Based on the route planned from point A to point B of FIG. 6, the route displayed would include data accessed from three map databases, namely, geographic regions 210, 212 and 202. The displayed information may include only a region surrounding the planned route or entire map databases.

In accordance with the foregoing, a navigation system, method and device are provided that permit routing between adjacent maps, such as between maps cut from a common cartographic data block. The process set forth in FIG. 9 provides a facility to transfer routing control automatically between different map databases to permit a navigation device to calculate a route between source and destination locations located in different map databases. It is understood that any number of map databases may be accessed during a route planning calculation.

Optionally, the steps in FIGS. 7 and 9 may be modified to operate upon map databases obtained from separate cartographic data blocks and from separate data suppliers. In this alternative embodiment, the steps are modified to compare features (e.g., nodes, segments, areas and the like) along region edges of two separate map databases. When a number of common features are correlated along the region edges of two map databases, the correlation information is used to construct an edge table. Hence, the edge table establishes a one-to-one correspondence between edge nodes in different map databases that were not cut from a common cartographic block.

Optionally, the map databases for adjacent geographic regions may be stored in a linked manner to form a direct connection between edge tables of adjacent map databases.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for calculating a route between first and second locations, comprising:

providing first and second data maps of at least partially different first and second geographic regions, respectively;

planning a first partial route partially extending between a first location in said first geographic region and a second location in said second geographic region based on first data map; and planning a second partial route partially extending between said second location in said second geographic region and said first location in said first geographic region based on said second data map.

2. The method of claim 1, further comprising combining said first and second partial routes to form a complete route between said first and second locations.

3. The method of claim 1, further comprising identifying a transition point between said first and second data maps.

4. The method of claim 1, further comprising determining an intersection of at least one of said first and second partial routes with an edge of at least one of said first and second data maps.

5. The method of claim 1, wherein said first and second data maps represent subsets of a common cartographic data block.

6. The method of claim 1, wherein at least one of said first and second partial routes cross a region edge of at least one of said first and second data maps.

7. The method of claim 1, wherein at least one of said planning steps includes analyzing multiple potential paths through a corresponding one of said first and second data maps.

8. The method of claim 1, wherein said planning steps for said first and second partial routes perform a bidirectional search.

9. The method of claim 1, further comprising transmitting from a mobile unit, an instruction notifying a remote server to perform at least a portion of said planning steps, and receiving, at said mobile unit, a route between said first and second locations.

10. A portable electronic device, comprising:

an input unit for receiving first and second locations in first and second data maps of roadway networks representing at least partially different first and second geographic regions, respectively;

a processor for at least partially planning a first partial route, based on said first data map, said first partial route having an end at said first location in said first geographic region, said processor at least partially planning a second partial route, based on said second data map, said second partial route having an end at said second location in said second geographic region; and an output unit presenting a route through said first and second data maps to a user based on said first and second partial routes.

11. The portable device of claim 10, wherein said processor combines said first and second partial routes to form a complete route between said first and second locations.

12. The portable device of claim 10, wherein said processor identifies a transition point between said first and second data maps.

13. The portable device of claim 10, wherein said processor determines an intersection of at least one of said first and second partial routes with an edge of at least one of said first and second data maps.

14. The portable device of claim 10, wherein said input unit includes memory that simultaneously stores said first and second data maps.

15. The portable device of claim 10, wherein said input unit includes a receiver that receives said first and second data maps from a remote server.

16. The portable device of claim 10, wherein at least one of said first and second partial routes cross a region edge of at least one of said first and second data maps.

17. The portable device of claim 10, wherein said input unit includes memory in said portable device that simultaneously stores both of said first and second data maps.

18. The portable device of claim 10, wherein said processor performs a bidirectional search for said first and second partial routes simultaneously from both of said first and second locations.

19. The portable device of claim 10, further comprising a transmitter instructing a remote server to perform at least a portion of said planning functions, said input unit including a receiver receiving from said remote server a route between said first and second locations.

20. A navigation system for calculating a route between first and second locations, comprising:

an input for receiving first and second locations in first and second data maps of roadway networks representing at least partially different first and second geographic regions, respectively;

a route planner for at least partially planning a first partial route, based on said first data map, said first partial route having an end at said first location in said first geographic region, said route planner at least partially planning a second partial route, based on said second data map, said second partial route having an end at said second location in said second geographic region; and an output unit presenting a route through said first and second data maps to a user based on said first and second partial routes.

21. The system of claim 20, wherein said route planner identifies a transition point between said first and second data maps.

22. The system of claim 20, wherein said route planner determines an intersection of at least one of said first and second partial routes with an edge of at least one of said first and second data maps.

23. The system of claim 20, wherein said input includes memory that stores simultaneously said first and second data maps.

24. The system of claim 20, wherein said route planner performs a bidirectional search for said first and second partial routes simultaneously from both of said first and second locations.

* * * * *